Jan. 29, 1963 W. S. DRUZ 3,075,775

RECORDING AND REPRODUCING APPARATUS

Filed March 10, 1960 5 Sheets-Sheet 1

INVENTOR.
Walter S. Druz
BY Hofgren, Brady,
Wegner, Allen & Stellman
Attys.

Jan. 29, 1963 W. S. DRUZ 3,075,775

RECORDING AND REPRODUCING APPARATUS

Filed March 10, 1960 5 Sheets-Sheet 2

INVENTOR.
Walter S. Druz
BY Hofgren, Brady, Wegner, Allen & Stellman
Attys.

RECORDING AND REPRODUCING APPARATUS

Filed March 10, 1960

5 Sheets-Sheet 3

INVENTOR.
Walter S. Druz
BY Hofgren, Brady,
Wegner, Allen & Stellman
Att'ys.

RECORDING AND REPRODUCING APPARATUS

Filed March 10, 1960 5 Sheets-Sheet 4

INVENTOR.
Walter S. Druz
BY Hofgren, Brady, Wegner, Allen & Stellman
Att'ys.

Jan. 29, 1963

W. S. DRUZ 3,075,775

RECORDING AND REPRODUCING APPARATUS

Filed March 10, 1960

5 Sheets-Sheet 5

INVENTOR.
Walter S. Druz
BY Hofgren, Brady,
Wegner, Allen & Stellman
Att'ys.

United States Patent Office 3,075,775
Patented Jan. 29, 1963

3,075,775
RECORDING AND REPRODUCING APPARATUS
Walter S. Druz, Bensenville, Ill., assignor, by mesne assignments, to International Commodities, Inc., Pasadena, Calif., a corporation of California
Filed Mar. 10, 1960, Ser. No. 14,124
16 Claims. (Cl. 274—17)

This invention relates to a sound recording and reproducing apparatus, and particularly to a mechanism for moving and controlling movement of a recording and reproducing head relative to a recording medium.

It is a general object of the invention to provide a new and improved apparatus of the type described.

In a preferred embodiment, the apparatus includes a rotatable drum for supporting a record medium therearound adapted to carrying a plurality of sound tracks closely spaced side by side longitudinally of the drum. Preferably, the record medium comprises a magnetic band suitably secured on the circumference of the drum and having a plurality of sound tracks parallel to each other and extending around the circumference of the drum except for the area in the vicinity of the ends of the band where the latter are held together or suitably secured to the drum. In order to obtain the maximum use of such a magnetic record medium, the separate messages are very closely spaced on the record medium, having a density on the order of 10–15 per inch lengthwise of the drum. In a preferred installation, though not necessarily forming a part of this invention, automatic controls are provided including a plurality of selector buttons, one for each message position on the record medium, any one or more of which may be simultaneously or successively depressed selectively to cause reproduction of the corresponding messages. Installations of this type find utility in supermarkets and other stores, for example, for the purpose of playing a message giving instructions as to the location in the store of certain articles associated respectively with the selector button. In installations of this nature where the separate passages on the record medium are very closely spaced, and where it is desirable to obtain prompt playback of the messages substantially in the order of their selection, a very significant problem arises in providing for rapid and accurate positioning of the playback head relative to the messages on the drum.

With these and other considerations in mind, it is a more specific object of the invention to provide a new and improved apparatus of the type described including a carriage movable transversely of the record medium, a playback head support pivotable on the carriage, a playback head on the support, and means mounting the playback head on the support adjustably for alignment with the passages on the record medium.

Another object is to provide in an apparatus of the character mentioned a new and improved drive mechanism for moving the carriage transversely of the record medium.

A further object is to provide in an apparatus of the type described a new and improved means for moving the playback head support relative to the carriage to move the head into and out of contact with the record medium.

Another object is to provide in an apparatus of the character mentioned a new and improved stop mechanism for controlling the location of the carriage to position the playback head selectively at positions corresponding respectively with the messages on the record medium.

A further object is to provide a new and improved stop mechanism of the character mentioned in the preceding paragraph including a plurality of selectively operable stops arranged alongside the straight line path of the carriage, and a selectively positionable stop blade on the carriage cooperable with the individual stops arranged alongside the path of the carriage.

Other objects and advantages will become readily apparent from the following detailed description taken in connection with the accompanying drawings, in which.

Figure 1:
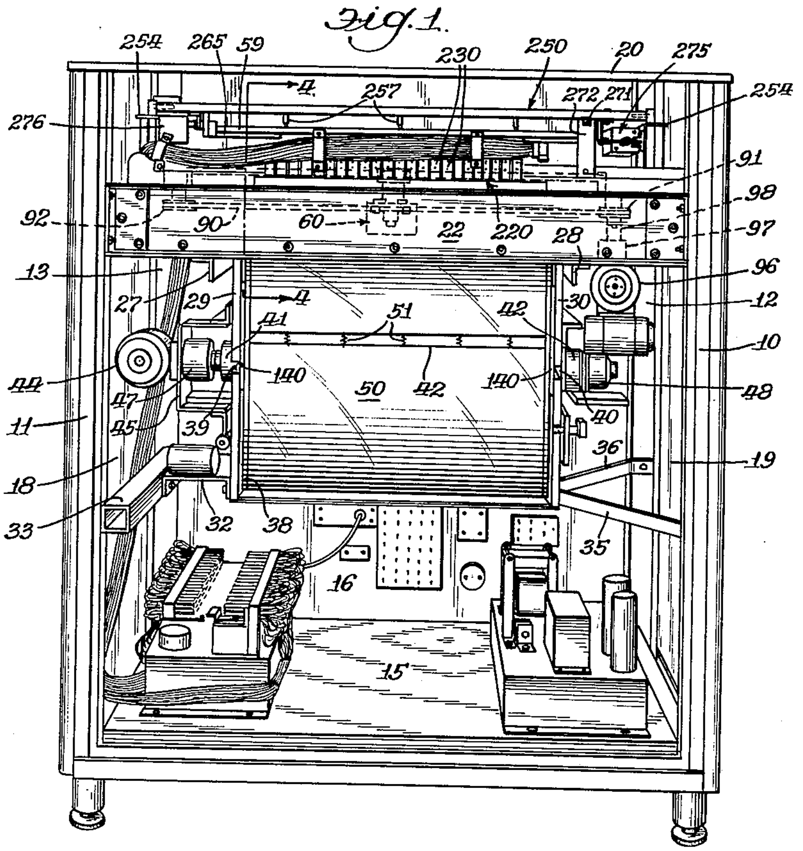
FIG. 1 is a rear perspective view of a recording and reproducing apparatus embodying the principles of the present invention, with the rear cover panel removed.

While illustrative embodiments of the invention are shown in the drawings and will be described in detail herein, the invention is suceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Figure 3:
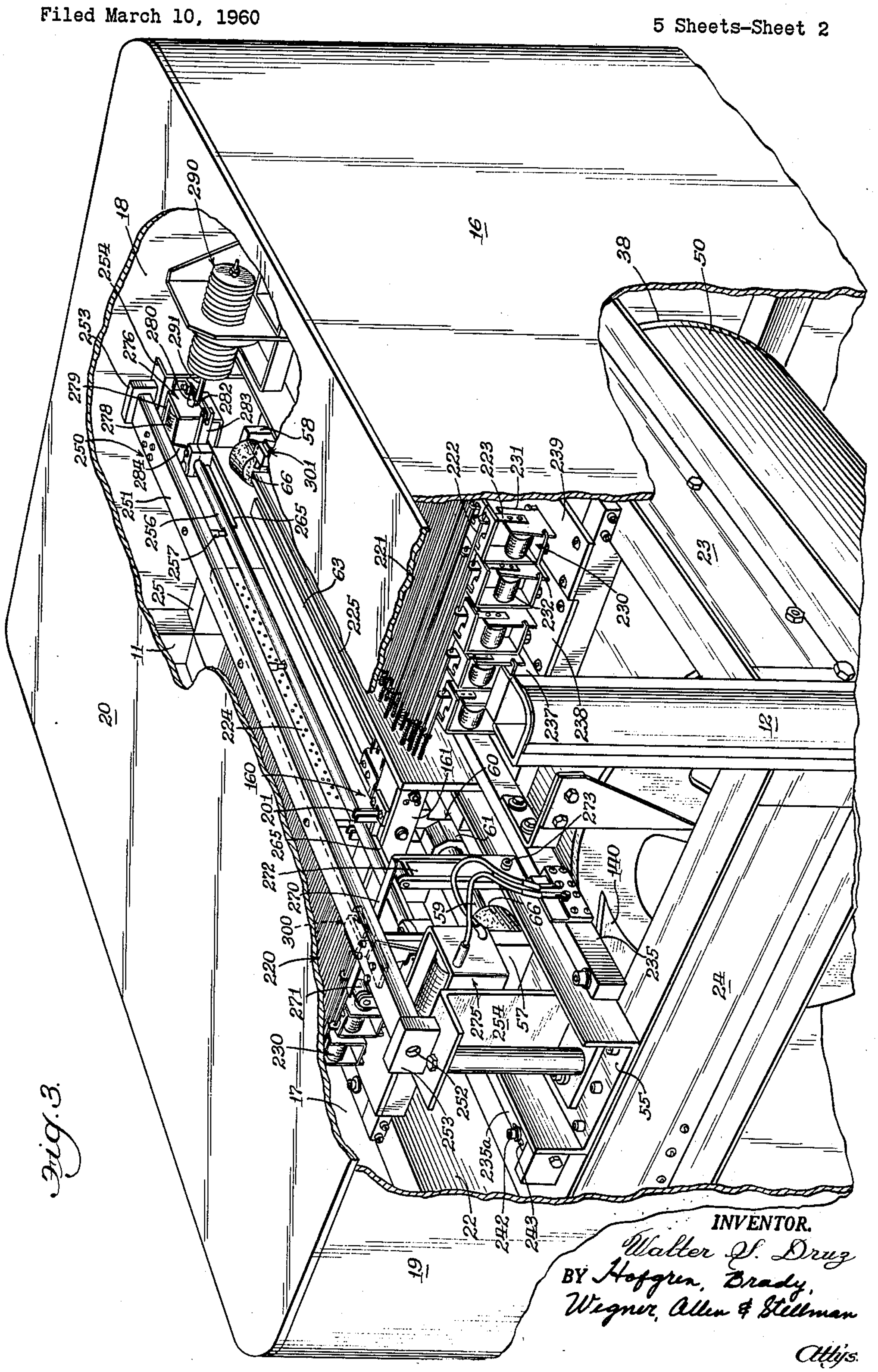
FIG. 3 is a fragmentary enlarged top perspective view of the apparatus illustrated in FIG. 1, taken from the left front of the apparatus, and with the cover partly broken away.

Referring to the drawings in more detail, a sound reproducing and recording apparatus embodying the principles of the present invention preferably includes a housing comprised of four corner posts as at 10, 11, 12 and 13 for supporting a bottom panel 15, a front panel 16, a rear panel 17, not visible in FIG. 1 but seen in part in FIG. 3, end panels 18 and 19, and a top panel 20.

Within the housing, near the top, four rectangularly arranged channel members 22, 23, 24 and 25 provide a framework secured to the corner posts and supporting a pair of transverse angle members 27 and 28 each in turn supporting a depending plate as at 29 and 30. At the bottom, the depending plate 29 is braced by a bracket 32 secured thereto and secured to a transverse tubular bar 33 which has opposite ends suitably secured to the posts 11 and 13. At the bottom, the depending plate 30 is supported by a pair of brackets 35 and 36 secured thereto and secured respectively to the posts 10 and 12. The plates 29 and 30 provide support for a rotatable drum 38 having shaft ends which may be inserted properly into position on the plates 29 and 30 through laterally opening slots 39 and 40 provided respectively in the two plates. Suitable bearing means may be mounted on the plates 29 and 30 as indicated in general at 41 and 42 for rotatably supporting the shaft ends.

The drum 38 is driven by a drive motor means 44 supported by a bracket 45 suitably attached to the depending plate 29, the motor being connected to the drum shaft through an electromagnetic clutch 47. At the opposite end of the drum, the drum shaft is preferably controlled by an electromagnetic brake 48. The drive motor 44, the clutch 47 and the brake 48 may be controlled by a suitable control circuitry which has not been described in detail herein.

The drum 38 supports a record medium in the form of a magnetic band 50 disposed around the drum and having opposite ends held together as by means of springs illustrated at 51 which maintain the record medium securely in position on the drum. The record medium 50 is adapted to have recorded thereon magnetically a plurality of parallel sound tracks each extending around the drum from a position adjacent one end of the medium to a position adjacent the other end of the medium, at a spacing longitudinally of the drum on the order of about 10–15 messages per inch of drum length. In a preferred embodiment, in excess of 200 messages, about 220, may be recorded on a medium such as that illustrated at 50 having a length, extending axially of the drum, a little more than 14 inches. The messages may be recorded and reproduced on the record medium by means of a recording and reproducing head to be described and erased by an erase head later described all at will under control of a circuitry which is not illustrated and described completely herein.

In order to provide for support and movement of the recording and reproducing head and the erase head, an elongated upwardly facing channel member 55 (FIGS. 3 and 4) has opposite ends resting respectively on the transverse channel members 24 and 25 and suitably secured thereto. Near opposite ends of the channel member, a pair of upright plates are secured thereto as at 57 and 58 (FIG. 3) and these uprights rigidly support opposite ends of a slide rod 59 of circular section. A carriage structure 60 includes a housing 61 slidable on the rod 59 and a pair of stabilizer rollers 62 which respectively engage the upper and lower surfaces of a stabilizer member in the form of an angle iron 63 suitably secured as at 64 to the upright rear wall of the channel 55. The engagement of the rollers 62 with the angle members 63 as the carriage 60 moves along the rod 69 prevents turning of the carriage structure on the guide rod. At opposite ends, adjacent the upright supporting plates 57 and 58, the rod 59 is preferably provided with encircling cushion members as at 66 of suitable resilient material to prevent harsh impact of the housing 61 with the plates 57 and 58 at opposite ends of the carriage travel.

Figures 2, 7:
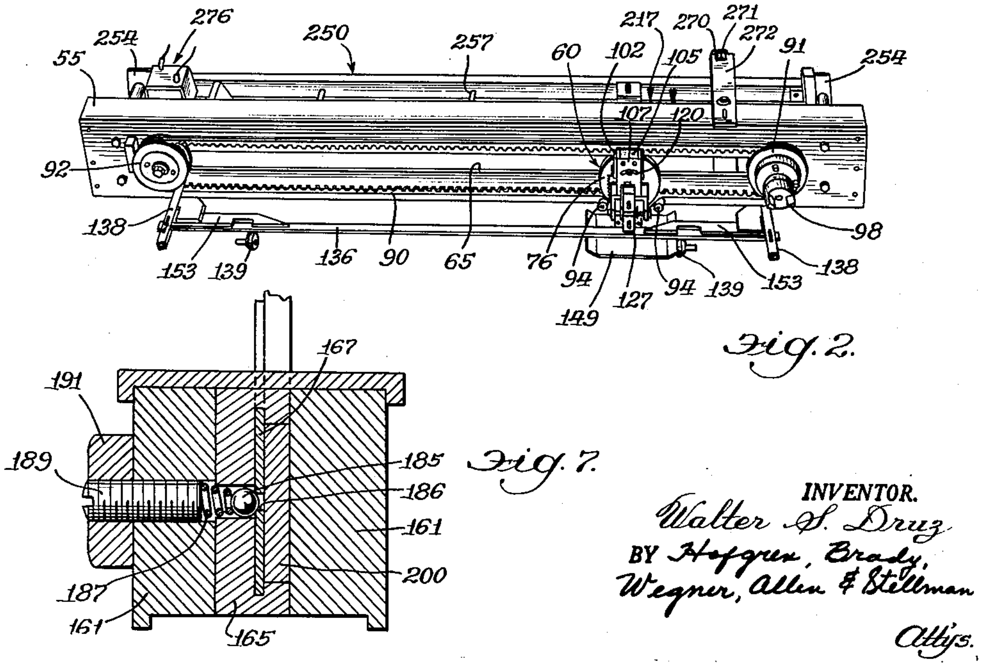
FIG. 2 is a bottom rear perspective view of the carriage and carriage drive assembly removed from the apparatus illustrated in FIG. 1.
FIG. 7 is an enlarged fragmentary transverse sectional view taken at about the line 7—7 of FIG. 4.
Figure 4:
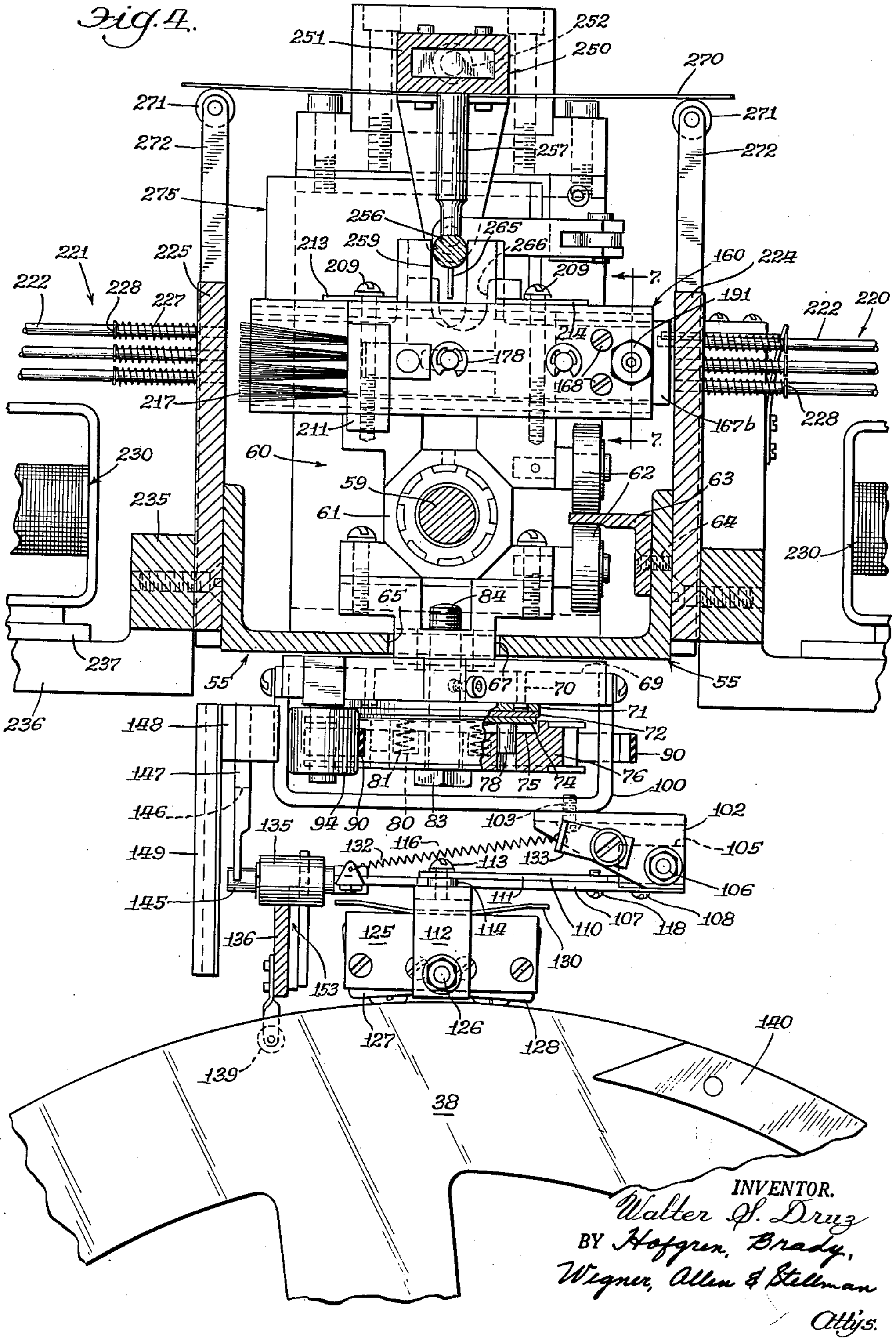
FIG. 4 is an enlarged fragmentary transverse sectional view taken about the line 4—4 of FIG. 1.

Referring also to FIGS. 2 and 4, in order to provide for reciprocable movement of the carriage 60 back and forth along the guide rod 59 and the stabilizer bar 63, in a path parallel to the axis of the drum 38, the channel member 55 includes a centrally positioned elongated slot therethrough as at 65, and a depending portion of the carriage structure projects downwardly through the slot 65 as at 67 and has a transverse plate 69 secured thereto. The plate 69 carries screws 70 and a circular disc 71 is disposed against the plate and has openings receiving the heads of screws 70 to prevent rotation of the disc. Bonded on the underside of the disc 71 is a suitable friction material 72, such as cork. A second circular disc 74 is disposed immediately beneath the friction material 72, in a complementary recess 75 in a pulley 76. The second disc 74 is provided with a plurality of pins as at 78 parallel to the axis of the disc and positioned in suitable complementary bores in the pulley 76 so that the disc and the pulley are constrained to rotate together while limited axial movement between the two is permitted. The pulley 76 is also provided with a plurality of recesses as at 80 receiving coiled compression springs as at 81 which engage the disc 74 and urge it against the friction material 72.

The disc 71 with its friction material 72, the disc 74 and pulley 76 are retained in position by the head 83 of a bolt or screw 84 threaded in the depending portion 67 of the carriage structure so that the pulley 76 and disc 74 are rotatable.

The arrangement described is such that a drive belt 90 may be engaged with the pulley 76, and so long as the carriage structure 60 is free to move the frictional resistance to rotation of the pulley 76 provides for motion of the carriage in unison with the drive belt when the latter is driven. On the other hand, when the carriage structure is held positively against movement, and the movement of the drive belt continues, relative rotation between the disc 74 and the friction material 72 enables stoppage of the carriage while motion of the drive belt and the pulley 76 continues. This enables a positive positioning of the carriage structure against selectively operable stop members, as will be explained, by continued operation of the drive means for limited periods of time after engagement of the carriage with the stops.

Figure 5:
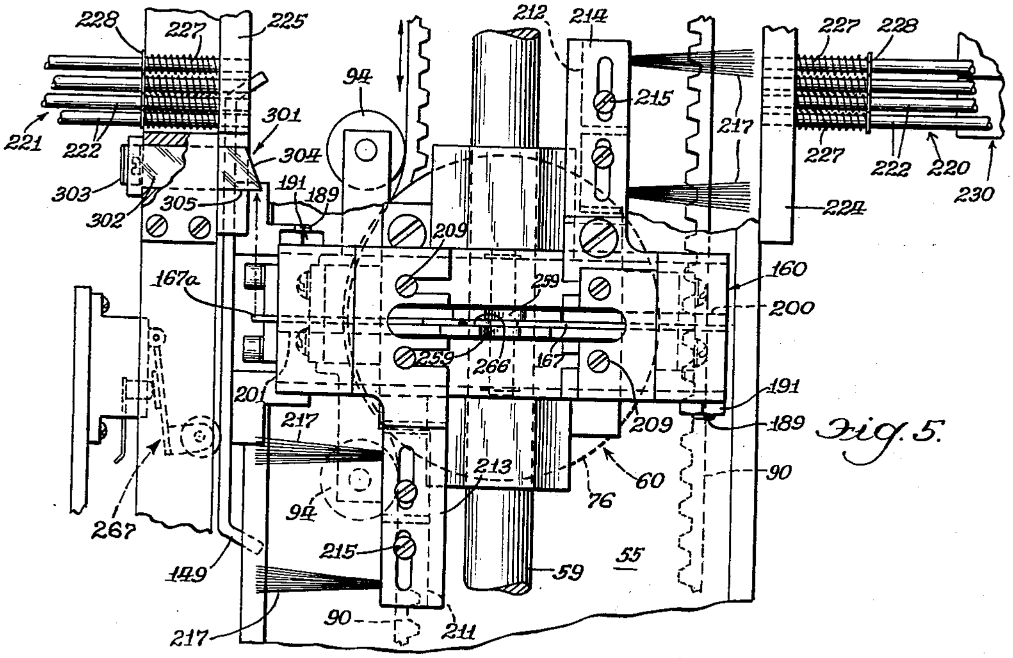
FIG. 5 is an enlarged fragmentary top plan view of the apparatus as illustrated in FIG. 1, with the top cover removed.

The carriage drive means includes cogged drive belt 90 in mesh with cogged pulley 76 on the carriage and trained about a drive pulley 91 and an idler pulley 92, both rotatably supported on the underside of the channel member 55. Positive engagement of the drive belt 90 with the pulley 76 on the carriage is insured by means of a pair of pressure rollers as at 94 on the carriage, which engage the outer surface of the belt and force the belt to follow a predetermined length on the periphery on the pulley 76, as best illustrated in FIGS. 2 and 5. As seen in FIGS. 1 and 2, a carriage drive motor 96 is supported on the framework and connected by a gear reduction unit 97 and a coupling 98 to the drive pulley 91.

In order to support the reproducing and recording head and the erase head on the carriage structure, the depending portion of the carriage beneath the channel member 55, includes a U-shaped bracket (FIG. 4) 100, and secured to this bracket is a smaller inverted U-shaped bracket 102 which may be held to the bracket 100 by screws as at 103. A block 105 is positioned between the depending legs of the U-shaped bracket 102 and pivotally mounted thereon as by means of a pivot shaft 106. The block 105 has secured thereto an elongated flat arm member 107 which may be held to the block by screws as at 108. A yoke-shaped plate 110 rests on the arm 107 and has bifurcated end portions, one of which is visible at 111, which are laterally displaced relative to the side edges of the arm 107. The end portions 111 are secured to an inverted U-shaped bracket 112 by means of screws as at 113 and intervening spacers as at 114, so that the U-shaped bracket 112 is constrained to move with the overlying plate 111.

Midway between the spaced arms 111 and midway of the width of the arm 107 the inverted bracket 112 is pivotally mounted on the arm 107 as by a pin 116 to facilitate adjustment of the bracket 112 angularly about the axis of the pin 116. The bracket 112 and the plate 110 may be secured to adjusted positions as by means of a screw 118 threaded into the plate 110 and extending through an arcuate slot in the arm 107 as at 120 (FIG. 2). Adjustment of the bracket 112 about the axis of the pin 116 enables alignment of the heads 127 and 128 with each other so that these track in the same path on the record medium as the drum 38 rotates.

A support 125 is pivotally mounted on the bracket 112 to turn freely about an axis as at 126, and the support 125 has secured thereon a recording and reproducing head as at 127 and an erase head as at 128, both adapted to engage the record medium on the drum 38. Pivotal movement of the support 125 on the bracket 112 about the axis 126 enables proper positioning of the heads 127 and 128 to conform to the curvature of the surface of the drum 38 to properly engage the medium thereon. Preferably, this pivotal movement is governed by a flat leaf spring 130 secured at a mid-portion to the part 125 and having opposite ends engageable with the arm 107 when the heads are lifted off the medium thereby to limit pivotal movement of bracket 125.

The pivotable arm 107 is suspended by a tension spring 132 having one end secured to the outer end of the arm 107 and the other end secured to a clip 133 adjustably mounted on the bracket 102 so that the tension of the spring may be varied by angular adjustment of the clip 133 to vary the pressure with which the heads engage the record medium.

At the outer end, remote from the pivot axis 106, the pivoted arm 107 carries a roller 135 adapted to rest upon an elongated lift bar 136 which extends substantially the length of the drum and is vertically slidable at opposite ends in brackets as at 138 (FIG. 2) suspended beneath the channel member 55. The lift bar carries near opposite ends a pair of follower rollers as at 139 engageable respectively with cams as at 140 on opposite ends of the drum. The cams are positioned adjacent the gap in the medium at opposite ends thereof as at 142 (FIG. 1), and extends a suitable distance in opposite directions about the circumference of the drum to engage the cam rollers 139 and elevate the lift bar 136 and therefore the heads 127 and 128 during the period when the gap in the record medium passes beneath the heads. During the interval while the heads are lifted from engagement with the record medium, the carriage structure 60 may be indexed longitudinally of the drum to properly position the heads for engagement with any selected one of the passage positions on the record medium.

The follower roller 135 on the arm 107 preferably includes an outwardly extending pin 145 engageable in a vertically disposed slot 146 in a depending bracket 147 secured to a support 148 in turn secured to the U-shaped bracket 100. The support 148 also preferably carries a guard plate 149.

Adjacent opposite ends of the lift bar 136, the bar is provided with a pair of cams 153 which are engageable by the follower roller 135 on the arm 107 as the carriage approaches opposite ends of its stroke in order to automatically lift the arm 107 and the heads 127 and 128 to remove the heads from the record medium and prevent engagement of the heads with any exposed portions of the drum adjacent opposite ends thereof.

Figure 6:
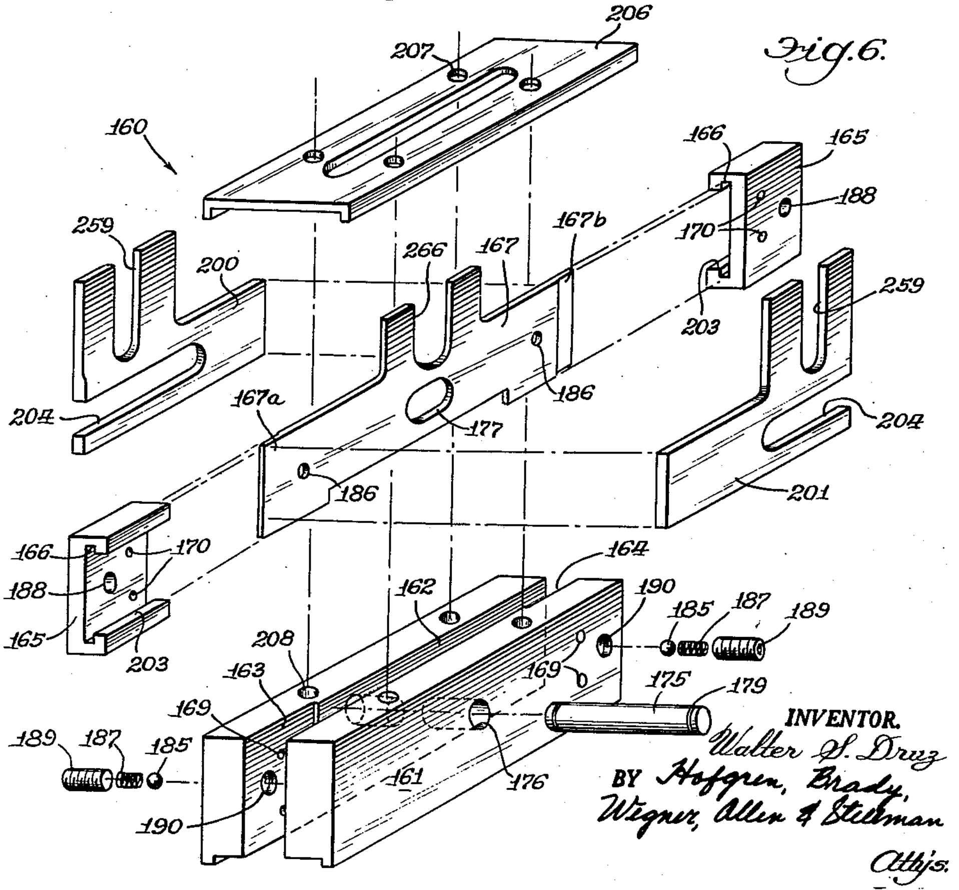
FIG. 6 is an enlarged exploded view of a stop blade and kicker blade assembly forming a part of the carriage.

In order to provide for accurate positioning of the carriage and the heads longitudinally of the drum and relative to the recorded passages on the record medium, the carriage includes a superstructure in the form of a stop blade and kicker blade assembly 160 illustrated in the exploded view of FIG. 6 and also illustrated in FIGS. 3, 4, 5 and 7. This assembly comprises a block 161 extending transversely across and secured to the bearing or housing member 61. The block is slotted as at 162 and at opposite ends as at 163 and 164 receives a pair of channel shaped members 165 providing guide ways as at 166 for opposite ends of a stop blade 167 positionable in the slot 162 with opposite ends thereof slidable in the guideways 166. The channel shaped guide members 165 are secured in position in the block 161 by screws as at 168 (FIG. 4) which pass through openings in the block as at 169 and thread into tapped holes in the guide members as at 170. The stop blade 167 is retained in the block 161 by means of a pin 175 which passes through openings as at 176 in the block and through an elongate slot 177 in the stop blade, the latter of which permits slidable movement of the stop blade relative to the block. The pin 175 is retained in the block 161 as by means of snap rings as at 178 (FIG. 4) engageable in grooves 179 adjacent opposite ends of the pin.

The stop blade is movable in the block from a first position illustrated in FIG. 5 wherein the left end of the blade as at 167*a* projects outwardly of the block for engagement with adjacent stop pins to a position illustrated in FIG. 4 wherein the right end of the blade as at 167*b* projects outwardly of the block for engagement with stop pins at this side of the carriage for positively locating the carriage longitudinally of the drum.

Detent means is provided for releasably holding the stop blade in each of the two operative positions, and such means includes a pair of detent balls as at 185 engageable respectively with seats as at 186 in the stop blade and urged toward the stop blade yieldably by means of compression springs 187 seated in openings 188 in the guide members 165 and held in position by adjustable screws as at 189 threaded into the block 161 as at 190 and locked as by nuts 191 (FIG. 7).

As the carriage moves away from the viewer in FIGS. 4 and 5, which would be toward the right in FIG. 1 and toward the left in FIG. 3, the stop blade 167 is positioned to engage stop pins at the right hand side of the carriage as viewed in FIGS. 4 and 5. Conversely, when the carriage is moved toward the viewer in FIGS. 4 and 5, which would be toward the left in FIG. 1 and toward the right in FIG. 3, the stop blade 167 is positioned to engage the stop pins at the left hand side of the carriage as viewed in FIGS. 4 and 5. In either case, the stop pin engaged by the stop blade 167 is immediately in advance of the stop blade 167 with reference to the contemplated continued advance of the carriage. In order to positively remove the stop pin from the path of the stop blade, the assembly 160 includes a pair of kicker blades 200 and 201, the former for removing stop pins at the right of FIGS. 4 and 5 in the path of the right end 167*b* of the stop blade, and the latter for removing stop pins at the left of FIGS. 4 and 5 in the path of the left end 167*a* of the stop blade.

The kicker blades 200 and 201 are slidably mounted in the block 161 against opposite faces of the stop blade 167. The kicker blades include reduced end portions which are slidably mounted between guide surfaces as at 203 on the channel shaped guide members 165, and include elongate open ended slots as at 204 which slidably receive the pin 175 which passes through the block 161. Preferably, the assembly illustrated in FIG. 6 is covered at the top by a closure plate 206 which may be attached to the block 161 as by means of screws 209 (FIG. 5) passing through openings 207 in the plate and threaded into tapped bores 208 in the block 161.

In the preferred embodiment illustrated, the assembly 160 also supports a pair of electrically insulative blocks attached thereto as at 211 and 212, one at each side of the slide rod 59 (FIG. 5). The blocks are attached respectively to thin elongated plate members 213 and 214 respectively as by screws 215, and the plates 213 and 214 are secured to the assembly 160 by means of the screws 209. The blocks 211 and 212 project in opposite directions relative to the motion of the carriage structure and carry conductive brushes as at 217 which may be utilized in the automatic control of the carriage motion, for the purpose of slowing down and braking the carriage immediately prior to engagement of the stop blade 167 with an operatively positioned stop pin.

In order to control the motion of the carriage to positively position the carriage accurately with reference to the recorded passages on the record medium, a plurality of individually selectively operable stop pins are provided alongside the path of the carriage for cooperation with the stop blade 167. The stops are preferably arranged in two series 220 and 221, one series at each side of the path of the carriage and each series comprised of a plurality of individually operable elongated stop pins 222. In each series the stops are mounted for movement laterally toward and away from the path of the carriage. The stops are longitudinally spaced to correspond respectively with positions on the record medium at which recorded passages occur, and longitudinally adjacent stop members are vertically spaced as will appear in FIG. 4 in order that the longitudinal spacing may be closer than if these stops were all arranged in a single horizontal plane.

The stops in the series at the right side of the carriage as viewed in FIGS. 4 and 5 have end portions which project through suitably spaced openings in an upright guide plate 224 which extends throughout the length of the carriage travel, and the individual stops in the series at the left of the carriage as viewed in FIGS. 4 and 5 have end portions which extend through suitably spaced openings in a similar guide plate 225.

Each individual stop pin 222 carries a compression spring as at 227 which has one end bearing against the associated guide plate and the opposite end bearing against a collar on the pin such as a snap ring 228, in order to at all times yieldably urge the stop pin to a retracted inoperative position wherein the end of the pin does not protrude beyond the face of the guide plate adjacent the carriage.

Each individual stop pin is movable to an operative position wherein the end portion thereof protrudes outwardly beyond the associated guide plate into the path of the stop blade 167. Movement of the stop pins for this purpose is controlled by individual solenoids 230, one associated with each stop pin, and including a pivoted core 231 which is attracted on energization of a coil 232 to move an arm 233 toward the path of carriage movement. The arm 233 is suitably secured to the associated stop pin 222 to move the latter to an operative position on energization of the solenoid, against the bias of the associated return spring 227. Energization of the solenoids 230 may be controlled by suitable circuitry not described in detail herein.

Each series of stop pins, the guide plate associated therewith and the bank of solenoids associated therewith are mounted separately, one such assembly at each side of the path of carriage movement. As best seen in FIGS. 3 and 4, for the series of stop pins 221, the guide plate 225 and the bank of solenoids associated therewith (at the front of the apparatus as viewed in FIG. 3) are mounted by means including an elongated bar 235 having opposite ends suitably supported on the frame work and suitably secured to the associated guide plate 225 which it supports. Also secured to the bar 235 are a pair of crossbars respectively adjacent opposite ends of the carriage travel, one visible in FIG. 3 as at 236. The bars as at 236 each have one end secured to the bar 235 and an outer end secured to the channel member 23 on the frame. The bars as at 236 are provided with stepped supporting surfaces for supporting a series of plates as at 237, 238 and 239 at gradually increasing heights in order to provide a stepped platform on which the bank of solenoids is supported in order to properly position the solenoids at levels corresponding with the levels of the associated stop pins.

The series of stop pins at 220, the guide plate 224 associated therewith and the bank of solenoids associated therewith are supoprted at the opposite side of the path oif the carriage by a similar mounting structure including a bar **235*a* corresponding to the bar 235, except that the bar 235*a* and the mounting support structure associated therewith are adjustable longitudinally of the path of the carriage as by means of an adjustment screw 241. After adjustment, the bar 235*a* may be secured in adjusted position by a screw 242 which passes through an elongated slot 243 in the bar 235*a*. The stop pins in the series 221 are arranged according to a predetermined pattern determined by the arrangement of the openings in the guide plate 225 through which the pins project. The guide pins in the series 220, and the openings through the guide plate 224 are arranged in an identical pattern, but one series of pins and the associated guide plate is longitudinally displaced relative to the other so that the pins in one series occur at positions respectively between the pins in the other series. The longitudinal adjustment provided at 241** enables an accurate displacement of one series relative to the other series.

Figures 8, 9, 10, 11:
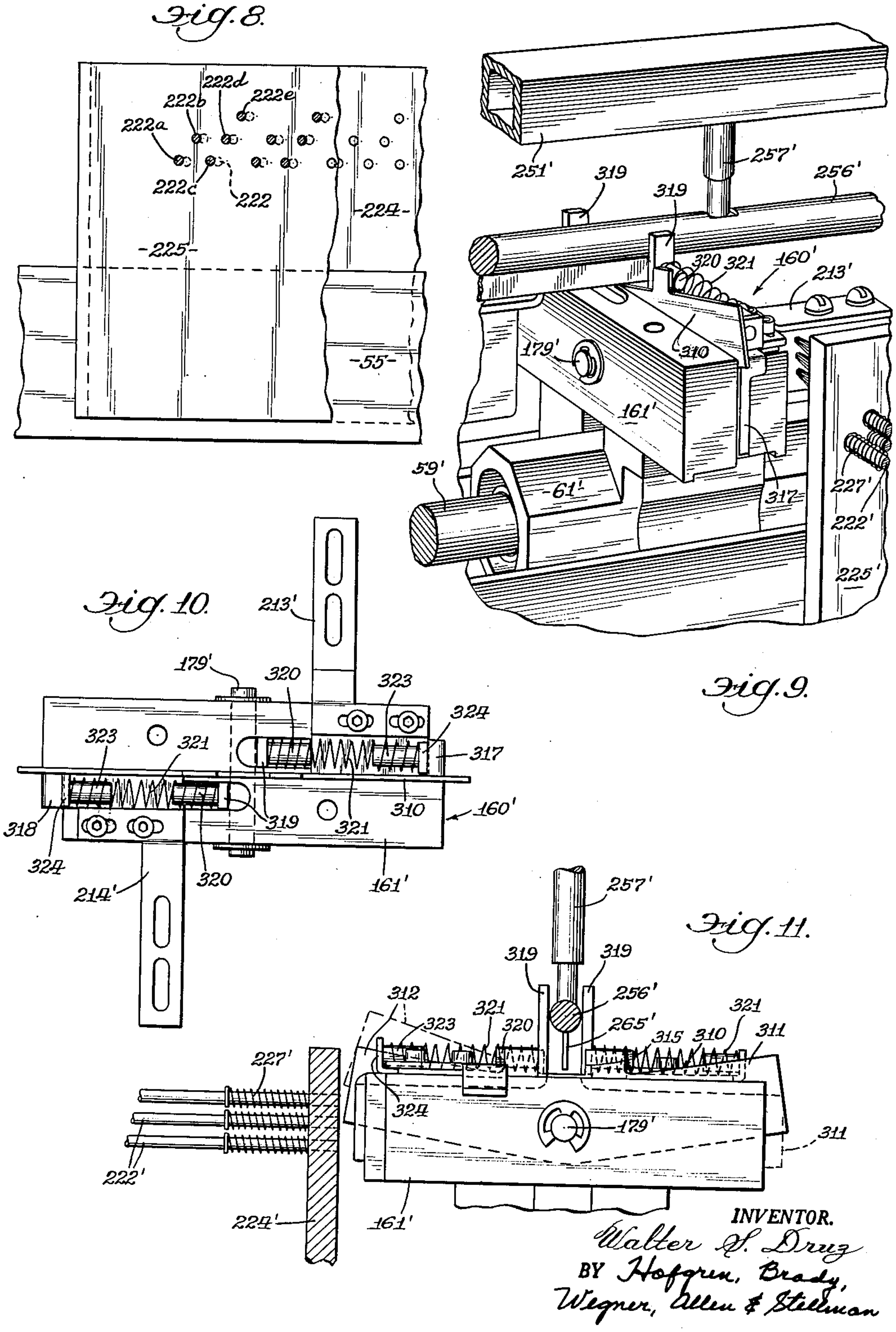
FIG. 8 is an enlarged fragmentary front elevational view of the plates through which the stop pins project.
FIG. 9 is a fragmentary enlarged perspective view similar to FIG. 3, illustrating a modified from of stop blade and kicker blade assembly.
FIG. 10 is a top plan view of the stop blade and kicker blade assembly illustrated in FIG. 9.
FIG. 11 is an elevational view of the assembly illustrated in FIG. 10, taken from the front of FIG. 10, including a fragmentary showing of the stop pins which cooperate with the assembly.

The relationship described immediately above is illustrated in FIG. 8, a fragmentary front elevational view, in which the front guide plate 225 has stop pins 222 illustrated in cross section and arranged in groups of five as at **222*a*, 222*b*, 222*c*, 222*d* and 222*e*, which are repeated longitudinally along the guide plate. In each group, and between groups also, longitudinally adjacent stop pins as at 222*a* and 222*b* are vertically spaced in order that the longitudinal spacing of the pins may be very close without substantially severing the guide plate. In the guide plate 224, the pins are arranged in a pattern identical to that in the guide plate 225, but the guide plate 224 and the pins therein are longitudinally displaced so that the pins in the plate 224 occur as illustrated in broken lines at the spaces between the pins in the plate 225**. This enables an even greater density of the stop pins and a corresponding greater density of the recorded passages on the record medium.

It will be understood that in use, the record medium is mounted on the drum 38 without any pre-recorded passages. The apparatus is utilized first to record passages with the positioning of the recording and reproducing head being controlled by the stop pins 222 which are engageable with stop plate 167 on the carriage. After the record medium has been provided with recorded passages, any of these may be selected for reproduction and the carriage and recording and reproducing head will be accurately positioned with reference to the recorded passage by virtue of the control of the stop pins over the carriage movement.

The position and the movement of the stop blade 167 and the kicker blades 200 and 201 are controlled by a rocker assembly generally designated 250. The rocker assembly includes a rock shaft in the form of a tubular member 251 of rectangular cross section having at opposite ends stub shaft portions as at 252 pivotable in bearings as at 253 supported on brackets 254 attached to the channel member 55. The rock shaft carries a parallel rod 256 suspended therebeneath as by bolt means 257, the rod 256 being positioned in slots as at 259 in the kicker blades 200 and 201.

On pivotal movement of the rock shaft 251 from the neutral central position illustrated in a direction to move the rod 256 toward the front of the machine (FIG. 3), that is, toward the left in FIG. 4, the kicker blades are moved from a central neutral position illustrated to a position in which the kicker 201 is extended to engage the operatively positioned stop pin 222 which at the time is engaged by the stop blade 167 to return such stop pin to an inoperative position. While the stop pins are normally urged to inoperative positions by the springs 227, it will be understood that with the pressure of the stop blade against an operatively positioned stop, the springs 227 may not be effective to return such stop pins to allow continued longitudinal movement of the carriage after a particular selected passage has been reproduced and the associated solenoid 230 deenergized. When the rock shaft is moved in the opposite direction, that is, toward the rear of the machine as illustrated in FIG. 3 and toward the right as illustrated in FIG. 4, the kicker blade 200 will be extended to engage and return the operatively positioned stop which is at the time engaged by the stop blade 167.

Near opposite ends of the carriage travel, the kicker rod 256 carries depending blade portions 265 which extend low enough to project into an upwardly facing slot 266 in the stop blade 167, for positioning the stop blade in either of the alternative operative positions illustrated in FIGS. 4 and 5. It will be understood that the elevation of the kicker rod 256 and the height of the slots 259 in the kicker blades are such that the rod 256 is constantly engaged with the kicker blades so that pivotal movement of the rock shaft 251 is at all times effective to cause movement of the kicker blades. On the other hand, the rod 256 does not engage the slot 266 in the stop blade, and pivotal movement of the rock shaft is not effective to cause movement of the stop blade except at a time when the carriage is positioned longitudinally of the drum such that one of the blades 265 on the rod 256 is engaged with the slot 266 in the stop blade.

In operation, when the carriage is at either end of its stroke, a cam actuated switch as at 267 is closed by the guard plate 149 (FIG. 5). On closure of this switch, the rocker assembly is pivoted to move the stop blade to one operative position for cooperation with the stops at one side of the carriage during movement of the carriage toward the other end of its stroke. At any message position along the carriage stroke, the rocker assemby may be operated to effect movement of the kicker blades without effecting operaton of the stop blade. At the end of such carriage stroke, the rocker assembly may be moved in the opposite direction to cause movement of the stop blade to the opposite operative position for engagement with the stops at the opposite side of the carriage during movement of the carriage return. During such return stroke, the rocker assembly may be operated to actuate the kicker blades without actuating the stop blade.

The rocker assembly is preferably normally maintained in a neutral central position by a yieldable biasing mechanism including an elongate flat spring 270 having a central portion attached to the rock shaft 251 and opposite end portions, at opposite sides of the carriage engaged respectively by rollers 271 carried on mounting brackets 272 which are vertically adjustably supported as at 273 on the channel member 55 in order to adjust the force of the spring on the rocker assembly.

Movement of the rocker assembly 250 is preferably controlled by a pair of solenoid actuator means 275 and 276 mounted respectively at opposite ends of the rocker assembly. The assembly 275 is utilized for rocking the rocker mechanism toward the front of the apparatus as viewed in FIG. 3 while the assembly 276 is utilized to move the rocker assembly toward the rear as viewed in FIG. 3. The solenoid assembly 276 includes a solenoid 278 mounted on a bracket 279 and having a plunger 280 connected to a link 282 pivoted on the bracket 279 and connected to a link 283 in turn connected to a pin 284 secured to the rock shaft 251. On energization of the solenoid 278, the plunger 280 is drawn into the solenoid and through the linkage 282 and 283 causes movement of the rocker assembly toward the rear. The solenoid assembly 275 is similar in construction except that it is oppositely mounted to cause movement of the rocker assembly toward the front of the apparatus as viewed in FIG. 3.

Preferably, movement of the rocker assembly is damped or retarded by a damping bellows assembly 290 which assures that return movement of the rocker assembly to the neutral position illustrated under the bias of the spring 270 does not involve overtravel beyond the central neutral position. This prevents untimely actuation of the kicker blades which might remove an operatively positioned stop pin 222 at the side of the carriage opposite that at which stops are currently being used to control carriage movement, depending upon the direction of movement. The damping assembly is connected to the link 282 as by a connecting rod 291.

In order to prevent return movement of the carriage from one end of its stroke without first reversing the position of the stop blade 167, a safety detent mechanism is provided at each end of the carriage travel as illustrated at 300 and 301, both illustrated in FIG. 3 and the latter illustrated in plan view in FIG. 5. Each detent mechanism comprises a laterally slidable detent 302 which is urged toward the path of the carriage by a flat leaf spring member 303. The detent includes a beveled surface as at 304 which is engageable by the projecting end of the stop blade as the stop blade moves in the proper direction relative to the stop pins associated with the particular detent so that the stop blade cams the detent aside to allow passage of the carriage in the proper direction. However, if the stop blade is not reversed at the end of the carriage stroke, on return movement of the carriage, the stop blade as at 167*a* (FIG. 5) engages a detent surface 305 which arrests carriage motion until such time as the stop blade is reversed to project from the other side of the carriage.

FIGS. 9, 10 and 11 illustrate a modified form of kicker blade and stop blade assembly. The modified stop assembly differs from that in the preceding figures primarily in the use of a pivoted stop blade instead of a slidable stop blade as in the foregoing figures. Parts in the modified construction which correspond substantially to parts in the preceding figures have been identified by similar reference numbers with a prime suffix.

In the modified construction, a block 161′ has a stop blade 310 which has a widely opened V-shape and includes a central portion pivotally mounted on a pin 179′ and oppositely extending end portions 311 and 312. The end portions are inclined outwardly and upwardly so that on pivotal movement of the stop blade, the end portion 311 is movable from a lower broken line position at the right of FIG. 11 wherein it is engageable with operatively positioned stop pins at this side of the carriage to an upper retracted position corresponding with the upper broken line position of the end portion 312 at the left of FIG. 11 wherein the end portion 311 would avoid engagement with any operatively positioned stops at the adjacent side of the carriage. Similarly, the opposite end portion 312 is also movable from a lower operative position (not illustrated) to an upper retracted position as illustrated in broken lines.

The upper central portion of the stop blade is slotted as at 315 for receiving the rocker blade portions 265 on the rocker assembly when the carriage is adjacent opposite ends of carriage travel in order to provide for actuation of the stop between the two operative positions at opposite ends of the carriage stroke.

Adjacent opposite faces of the stop blade, a pair of kicker blades are slidably mounted in the block as at 317 and 318. The adjacent inner ends of the kicker blades 317 and 318 are provided with upright posts as at 319 each of which carries a pin as at 320 on which a compression spring 321 is seated to urge the kicker blades to retracted positions. Opposite ends of the springs 321 are seated respectively on pins 323 on posts 324 which are integral respectively with plates 213′ and 214′ for supporting blocks which carry conductive brushes similar to those illustrated at 217 in FIGS. 1–8.

The upright posts 319 on the kicker blades are engageable with the kicker rod 256′ forming a part of the rocker assembly so that on pivotal movement of the rocker assembly in one direction from the neutral central position, one kicker blade is extended outwardly beyond the carriage structure at one side thereof for returning operatively positioned stops adjacent thereto, and on pivotal movement of the rocker assembly in the opposite direction, the other kicker blade is extended outwardly beyond the carriage assembly. In this construction, the compression springs 321 which urge the kicker blades to retracted positions also function to maintain the rocker assembly normally in a central neutral position, and a spring such as that at 270 in FIGS. 1–8 would be unnecessary in this modification.

I claim:

1. In a reproducing apparatus, a carriage movable in a straight line path transversely of a record medium, a playback head mounted on the carriage for movement therewith selectively to positions corresponding respectively with sound tracks on the medium, a stop plate alongside the path of carriage movement, a plurality of stop pins arranged in a series to project respectively through openings in the stop plate at positions corresponding respectively with sound tracks on the medium, longitudinally adjacent pins and the openings through which they project being vertically spaced to enable close longitudinal spacing, means for moving the stop pins selectively between inoperative nonstop positions and operative stop positions, and a stop blade mounted on the carriage for movement between a first retracted inoperative position and a second position engageable with the operatively positioned stop pins.

2. In a reproducing apparatus, a carriage reciprocable transversely of a record medium, a playback head mounted on the carriage for movement therewith selectively to positions corresponding respectively with sound tracks on the medium, a plurality of stops arranged in a series alongside of the path of the carriage at spaced positions corresponding respectively with sound tracks on the medium, means for moving the stops selectively from inoperative nonstop positions to operative stop positions, a stop blade mounted on the carriage for movement between a first retracted inoperative position and a second position engageable successively with the operatively positioned stops, and a conductive brush mounted on the carriage alongside the stop blade in a position engageable with an operably positioned stop in advance of the stop blade.

3. In a reproducing apparatus, a frame, a carriage movable on the frame in a straight line path transversely of a record medium, a playback head mounted on the carriage for movement therewith selectively to positions corresponding respectively with sound tracks on the medium, a plurality of stops on the frame arranged in a series alongside of the path of the carriage at positions corresponding respectively with sound tracks on the medium, means for moving the stops selectively between inoperative nonstop positions and operative stop positions, a stop blade mounted on the carriage for movement between a first retracted inoperative position and a second position engageable with the operatively positioned stops, a first rocker member on the frame adjacent one end of carriage travel engageable with the stop blade to move the blade from the inoperative position to the operative position, and a second rocker member on the frame adjacent the other end of carriage travel engageable with the stop blade to move the blade from operative position to inoperative position.

4. In a reproducing apparatus, a frame, a carriage movable on the frame transversely of a record medium, a playback head mounted on the carriage for movement therewith selectively to positions corresponding respectively with sound tracks on the medium, a plurality of stops on the frame arranged in a series alongside of the path of the carriage at positions corresponding respectively with sound tracks on the medium, means for moving the stops selectively from inoperative nonstop positions to operative stop positions, a stop blade mounted on the carriage for movement between a first retracted inoperative position and a second position engageable successively with the operatively positioned stops, a kicker member movably mounted on the carriage for movement from a retracted position to a position to engage and return the operatively positioned stop engaged by the stop blade, and an elongated rocker member on the frame parallel to the drum axis slidably engaged with the kicker member as the carriage moves and rockable to move the kicker member between the retracted position and the operative position.

5. In a reproducing apparatus, a carriage movable in a straight line path transversely of a record medium, a playback head mounted on the carriage for movement therewith selectively to positions corresponding respectively with sound tracks on the record medium, a plurality of stops arranged in two series respectively along opposite sides of the path of the carriage at positions corresponding respectively with sound tracks on the medium, means for moving the stops selectively between inoperative nonstop positions and operative stop positions, and stop blade means mounted on the carriage for movement between a first position engageable with the operatively positioned stops at one side of the carriage and a second position engageable with the operatively positioned stops at the opposite side of the carriage.

6. A combination as defined in claim 5, including a detent at the end of each series of stops in the path of the stop blade when the stop blade is positioned to engage the associated stops, yieldable on engagement by the stop blade during movement of the carriage from the last stop to the end of carriage travel, but immovable when the carriage is reversed and the position of stop blade is not reversed.

7. In a reproducing apparatus, a carriage movable transversely of a record medium, a playback head mounted on the carriage for movement therewith selectively to positions corresponding respectively with sound tracks on the record medium, a pair of stop plates respectively along opposite sides of the path of the carriage, a plurality of stops associated with each plate arranged in a series to project respectively through openings in the plate at positions corresponding respectively with sound tracks on the medium, the stops in one plate being longitudinally spaced to correspond respectively with alternate tracks on the record medium, and the stops in the other plate being longitudinally spaced to correspond respectively with the remaining intervening tracks on the medium, means for moving the stops selectively between inoperative nonstop positions and operative stop positions, and stop blade means mounted on the carriage for movement between a first position engageable with the operatively positioned stops at one side of the carriage and a second position engageable with the operatively positioned stops at the opposite side of the carriage.

8. The combination defined in claim 7, including means for adjusting one stop plate longitudinally relative to the other.

9. In a reproducing apparatus, a rotatable support for a record medium having a plurality of sound tracks recorded thereon and closely spaced side by side, a carriage movable in a straight line path transversely of the medium, a playback head mounted on the carriage for movement therewith selectively to positions corresponding respectively with sound tracks on the record medium, means for lowering and raising the head on the carriage into and out of engagement with the medium, a plurality of stops arranged in two series respectively along opposite sides of the path of the carriage at positions corresponding respectively with sound tracks on the medium, means for moving the stops laterally relative to the path of the carriage selectively between inoperative nonstop positions and operative stop positions, and a stop blade slidable on the carriage laterally between a first position in which one end of the blade is engageable with the operatively positioned stops at one side of the path of the carriage and a second position in which the other end of the blade is engageable with the operatively positioned stops at the opposite side of the path of the carriage.

10. The combination defined in claim 9, including detent means on the carriage for releasably retaining the stop blade in either position.

11. In a reproduction apparatus, a rotatable support for a record medium having a plurality of sound tracks recorded thereon and closely spaced side by side, a carriage movable in a straight line path transversely of the medium, a playback head mounted on the carriage for movement therewith selectively to positions corresponding respectively with sound tracks on the record medium, means for lowering and raising the head on the carriage into and out of engagement with the medium, a plurality of stops arranged in two series respectively along opposite sides of the path of the carriage at positions corresponding respectively with sound tracks on the medium, means for moving the stops laterally relative to the path of the carriage selectively between inoperative nonstop positions and operative stop positions, a generally V-shaped stop blade mounted on the carriage for pivotal movement about an axis parallel to the drum axis between a first position in which one end of the blade is engageable with the operatively positioned stops at one side of the path of the carriage and a second position in which the other end of the blade is engageable with the operatively positioned stops at the opposite side of the path of the carriage.

12. In a reproducing apparatus, a carriage movable in a straight line path transversely of a record medium, a playback head mounted on the carriage for movement therewith selectively to positions corresponding respectively with sound tracks on the record medium, a plurality of stops arranged in two series respectively along opposite sides of the path of the carriage at positions corresponding respectively with sound tracks on the medium, means for moving the stops selectively from inoperative nonstop positions to operative stop positions, stop blade means mounted on the carriage for movement between a first position engageable with the operatively positioned stops at one side of the carriage and a second position engageable with the operatively positioned stops at the opposite side of the carriage, and a pair of kicker blades laterally slidable on the carriage, one on each side of the stop blade, one movable from a retracted position to an extended position to engage and return an operatively positioned stop at one side of the carriage, and the other movable from a retracted position to an extended position to engage and return an operatively positioned stop at the other side of the carriage.

13. In a reproducing apparatus, a frame, a rotatable drum on the frame for supporting a record medium therearound having a plurality of sound tracks recorded thereon and closely spaced side by side longitudinally of the drum, a carriage movable on the frame longitudinally of the drum, a playback head mounted on the carriage for movement therewith selectively to positions corresponding respectively with sound tracks on the record medium, a plurality of stops on the frame arranged in two series respectively along opposite sides of the path of the carriage at positions corresponding respectively with sound tracks on the medium, means for moving the stops selectively from inoperative nonstop positions to operative stop positions, a stop blade mounted on the carriage for movement between a first position engageable with the operatively positioned stops at one side of the carriage and a second position engageable with the operatively positioned stops at the opposite side of the carriage, a pair of kicker blades laterally slidable on the carriage, one on each side of the stop blade, one movable from a retracted position to an extended position to engage and return an operatively positioned stop at one side of the carriage, and the other movable from a retracted position to an extended position to engage and return an operatively positioned stop at the opposite side of the carriage, a rock shaft mounted on the frame parallel with the drum axis, an elongate rod supported by the rock shaft and engaged in a slot in each kicker blade to move the kicker blades from retracted to extended positions, a first member on said rod adjacent one end of carriage travel engageable in a slot in the stop blade to move the latter from the first position to the second position, and a second member on said rod adjacent the other end of carriage travel engageable in the slot in the stop blade to move the latter from the second position to the first position.

14. A combination as defined in claim 13, including means yieldably urging the rock shaft and kicker blades to positions in which both kicker blades are retracted, and means damping movement of the rock shaft toward the last recited position on retraction of a kicker blade to prevent overtravel of the rock shaft and untimely extension of the other kicker blade.

15. In a reproducing apparatus, a frame, a rotatable drum on the frame for supporting a record medium therearound having a plurality of sound tracks recorded thereon and closely spaced side by side longitudinally of the drum, a carriage movable on the frame longitudinally of the drum, a drive pulley and an idler pulley mounted on the frame at positions spaced longitudinally of the drum, a drive belt trained around the pulleys, a third pulley frictionally held on the carriage and engaged with the belt to cause movement of the carriage with the belt when the carriage is free to move but rotatable on the carriage when the carriage is held against movement and the belt is driven, a playback head mounted on the carriage for movement therewith selectively to positions corresponding respectively with sound tracks on the medium, a plurality of stops on the frame arranged in a series alongside of the path of the carriage at positions corresponding respectively with sound tracks on the medium, means for moving the stops selectively between inoperative nonstop positions and operative stop positions, and a stop blade mounted on the carriage for movement between a first retracted inoperative position and a second position engageable with the operatively positioned stops.

16. In a reproducing apparatus, a frame, a rotatable drum on the frame for supporting a record medium therearound having a plurality of sound tracks recorded thereon and closely spaced side by side longitudinally of the drum, a carriage movable on the frame longitudinally of the drum, a playback head support, means pivotably mounting one end of the support on the carriage, means mounted on the carriage and defining a vertical slot slidably engaging the opposite end of the support for limiting movement of the support to movement about its pivot axis, a playback head mounted on the support for movement therewith selectively to positions corresponding respectively with sound tracks on the medium, an elongate lift bar movably mounted on the frame parallel to the drum axis, a follower on the head support engaging the lift bar, cam means on the drum and follower means on the lift bar engaging said cam means to elevate and lower the lift bar and playback head in timed relation to rotation of the drum, a plurality of stops arranged in a series alongside the path of the carriage at positions corresponding respectively with sound tracks on the medium, means for moving the stops selectively between inoperative nonstop positions and operative stop positions, and a stop blade mounted on the carriage for movement between a first retracted inoperative position and a second position engageable with the operatively positioned stops.

References Cited in the file of this patent

UNITED STATES PATENTS

| | | |
|---|---|---|
| 2,347,995 | Dettle | May 2, 1944 |
| 2,398,067 | Winkler | Apr. 9, 1946 |
| 2,435,522 | Wagenknecht | Feb. 3, 1948 |
| 2,733,425 | Williams | Jan. 31, 1956 |
| 2,832,841 | Eldridge | Apr. 29, 1958 |
| 2,943,860 | D'Arcy | July 5, 1960 |
| 2,953,384 | Walters | Sept. 20, 1960 |